United States Patent [19]

Brown

[11] Patent Number: 4,817,732
[45] Date of Patent: Apr. 4, 1989

[54] SPIDER WHEEL FOR A ROTARY INCORPORATOR

[75] Inventor: Douglas P. Brown, Bettendorf; Donald R. Peck, Clive, both of Iowa

[73] Assignee: Deere & Company, Moline, Ill.

[21] Appl. No.: 918,960

[22] Filed: Oct. 15, 1986

Related U.S. Application Data

[63] Continuation-in-part of Ser. No. 747,143, Jun. 20, 1985, Pat. No. 4,646,850.

[51] Int. Cl.⁴ ............................................. A01B 21/02
[52] U.S. Cl. .................................... 172/548; 172/54; 172/771; 172/551
[58] Field of Search ............... 172/556, 551, 555, 657, 172/574, 552, 572, 573, 548, 153, 771; 111/6

[56] References Cited

U.S. PATENT DOCUMENTS

| | | | |
|---|---|---|---|
| 957,722 | 5/1910 | Walker | 172/551 |
| 963,716 | 7/1910 | Kramer | 172/556 |
| 1,844,255 | 2/1932 | Kaupke | 172/556 |
| 3,653,449 | 4/1972 | Boetto | 172/771 |

Primary Examiner—Richard J. Johnson

[57] ABSTRACT

A spider wheel for a rotary incorporator for one pass incorporation of chemicals or small grains in previously tilled soil. The incorporator includes two rows of aggressive, large diameter spider wheels supported from a toolbar for rotation in the soil about axes offset at an acute angle to the transverse direction. The spider wheels are to provide good incorporation and a smooth seed bed without hilling or chemical banding. A smaller diameter, depth limited spider wheel on each outermost end of the implement feathers the effect of the angled wheels. The spider wheels include tines having soil working surfaces for good mixing and soil moving action and a large gullet area for good trash shedding and throwing characteristics. The tines on the spider wheels adapted for use in firmer soils, for example, the forwardmost wheels on the incorporator, have end portions which are oriented to reduce scrubbing of the soil for easier entry and reduced vertical force requirements while the inner portions of the tines help to limit depth of penetration of the wheels.

13 Claims, 5 Drawing Sheets

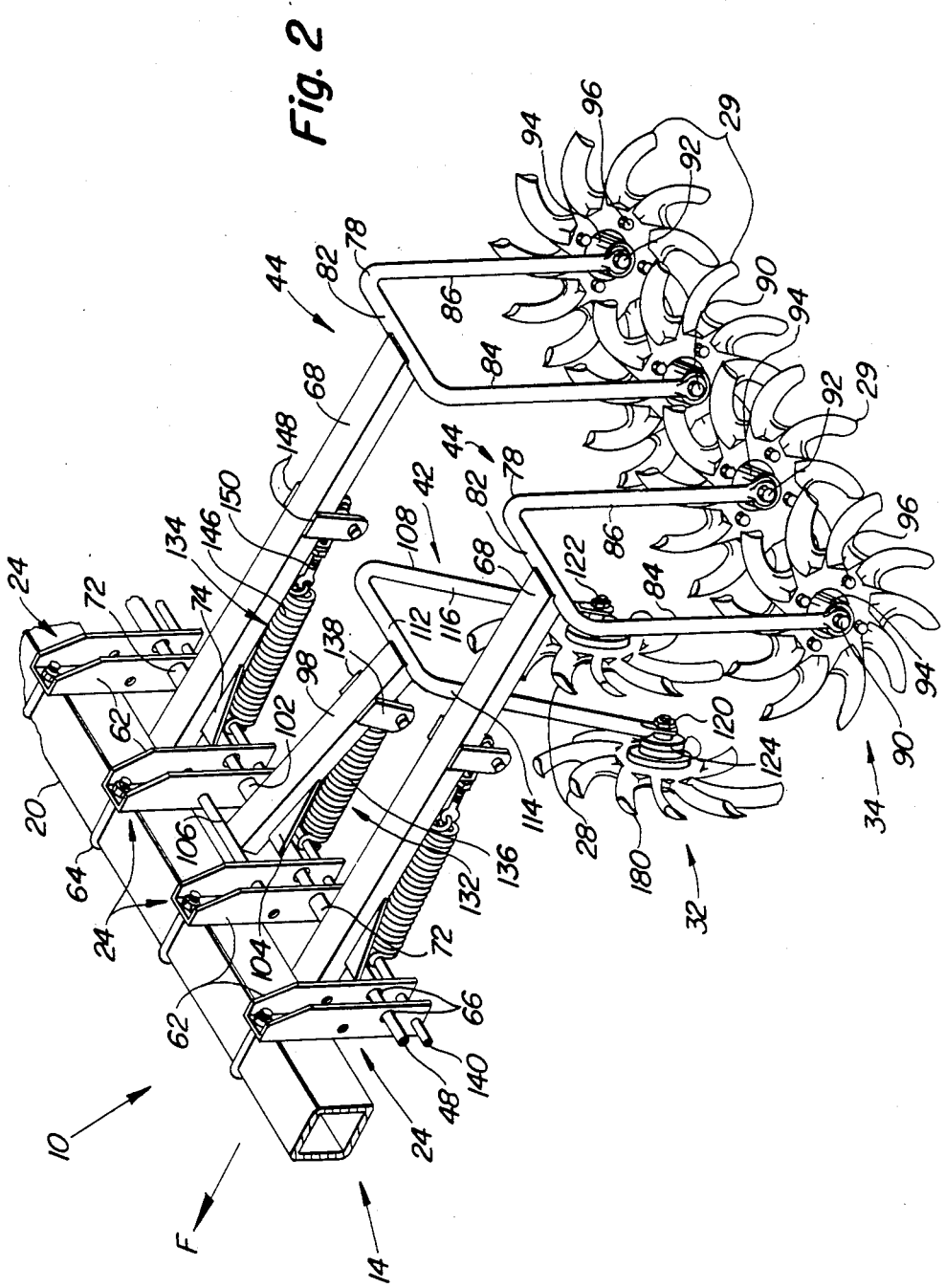

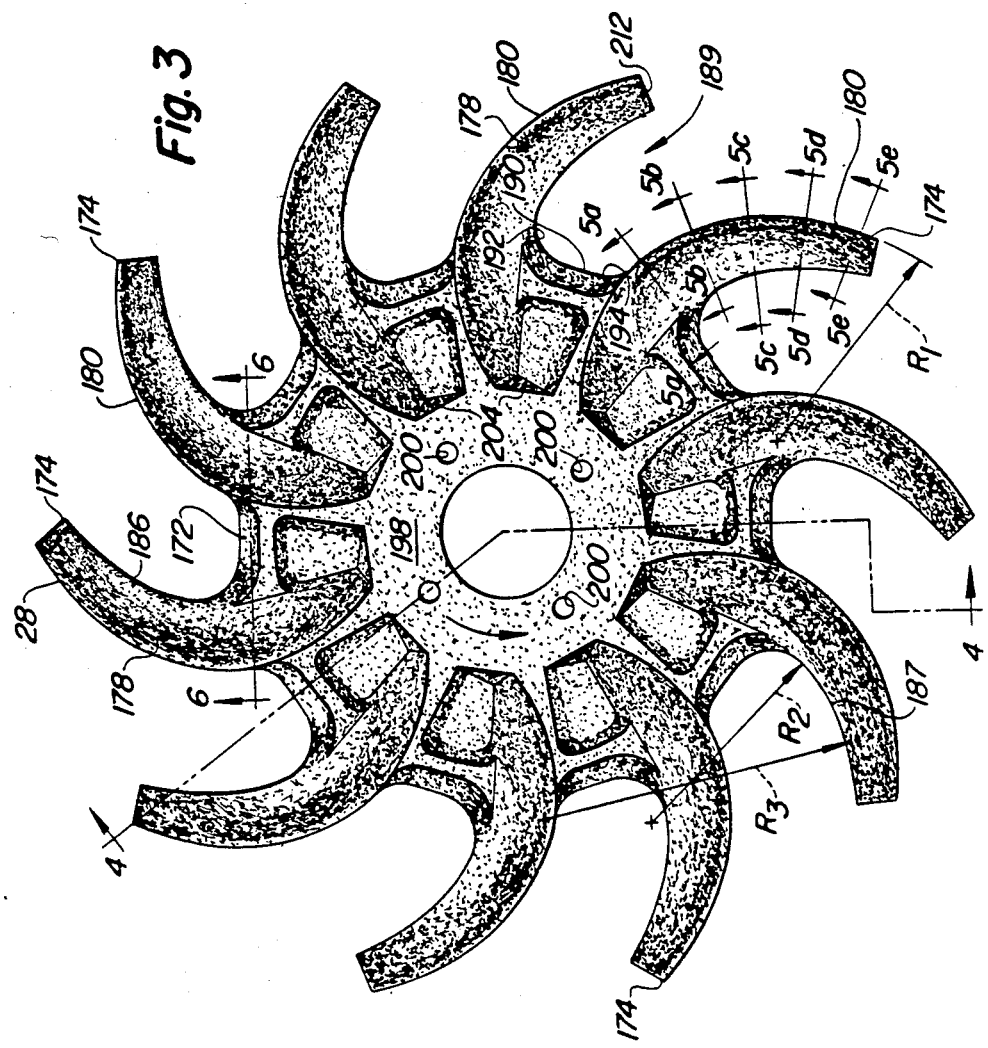

SPIDER WHEEL FOR A ROTARY INCORPORATOR

This is a continuation-in-part of application Ser. No. 747,143, filed June 20, 1985, now U.S. Pat. No. 4,646,850.

BACKGROUND OF THE INVENTION

The present invention relates generally to agricultural implements, and more specifically, to implements for incorporating chemicals or small grains into the soil.

Chemicals have become widely used in the farming industry. Typically, a chemical is applied to the surface of previously worked soil and a maximum of two additional tillage passes are made either with a disk or field cultivator to incorporate the chemical into the upper few inches of the soil. Although some farmers eliminate the recommended second incorporation pass, they must rely on favorable weather conditions to prevent failure, and horizontal and vertical distribution patterns of the chemical often are much less than optimum. Although surface applied chemicals are available at a higher cost, they are usually incorporated by rainfall and there is a considerable amount of risk involved with such a chemical since rainfall is highly unpredictable. Often the cost of chemicals which eliminate incorporation passes exceeds the combined cost of the tillage and chemicals they replace.

Where two incorporation passes with a conventional tool are not necessary, special harrows or S-tine cultivators have been devised for use in one or more passes. These tools are limited to shallow incorporation of herbicides in low residue environments. Another popular approach has been to combine the tillage of two passes into one pass by combining the components of two conventional machines into one frame. However, the price and the draft are approximately doubled. The advantage of making passes in different directions has been lost, and therefore streaking and marginal performance are common with many of the available incorporating devices. Combining tillage work also reduces the versatility of an implement. For example, if a late mechanical weed kill is desired, all tillage must be done just prior to planting. This can require a very large tractor in order to stay ahead of a large modern planter. Although disks and field cultivators can provide adequate incorporation in some circumstances, they generally require a high energy consumption and a massive frame. Streaking or banding of the chemicals is common, particularly when a disk with large nd widely spaced disk blades is used. The operating speeds, and thus the productivity, of these types of machines are often limited to beyond the level which is satisfactory to the farmer.

Although some rotary incorporating machines have been available on the market, these have not been entirely satisfactory for one or more reasons. Some rotary hoe type of weeders having a single transversely extending row of spider wheels have been utilized to incorporate pre-plant chemicals. However, these can only be used in certain conditions and where incorporation is not critical, or alternatively, where two passes of the rotary hoe are utilized. A single row of rotary hoe spider wheels tends to cause the chemical to streak, leaving hot bands of chemical where crops can be damaged or destroyed while leaving other areas substantially void of chemicals.

Often the spider wheels designed for rotary hoeing to remove small weeds and break up surface crusts are not suitable for mixing soil. The tines of such hoes are typically triangularly shaped with a principle design criteria being easy entry into the soil. This design criteria can also result in poor depth control especially in loose soil. Unless there is adequate depth control of the spider wheels, the angled wheels can act more like solid disks, pushing the soil to one side rather than letting the soil flow through the tines and mix and incorporate the chemical.

Other types of rotary incorporators use two or more angled gangs of spider wheels spaced fore-and-aft with respect to each other. Typically the forward gang is angled with respect to the transverse in an opposite direction as compared to the rearward gang. Numerous pairs of the fore-and-aft spaced gangs are located transversely along a large frame with adjacent gangs being angled in opposite directions with respect to the transverse to generally equalize side forces along the width of the machine. In an implement where such gangs are used, the area between adjacent gangs produces a discontinuity in the soil throwing and mixing action as compared with the action within the confines of the gang itself. Also, the outermost wheels of the machine tend to throw dirt and chemical beyond the width of the machine so that there is ridging and chemical mixing variations adjacent the edge of the machine. Although such machines may have improved incorporation as compared with a conventional disk arrangement, a massive and expensive frame is necessary to support the gangs of spider wheels. Therefore, such an implement is comparable in size and in price to a disk or other conventional tillage implement.

Previous rotary type incorporators including tandem sets of spider wheels closely spaced fore-and-aft plug easily in trashy conditions. Some arrangements utilize a wheel support arm closely spaced to the spider wheel, which also presents a potential clogging problem in trashy conditions. The spider wheels themselves often are of the type wherein the opening between the teeth decreases substantially in the direction toward the hub to thereby cause wedging of trash. The tooth profile is often designed to provide easy entry into the soil, rather than providing good cleaning characteristics which are necessary in heavy trash and good depth control function which is necessary for soil mixing and incorporation.

OBJECTS OF THE INVENTION

Therefore, it is an object of the present invention to provide an improved spider wheel for a rotary incorporator for incorporating chemicals or small grains into previously tilled soil. It is another object of the invention to provide such a spider wheel having better mixing, trash-shedding and depth control characteristics than at least most previously available spider wheels.

It is a further object of the invention to provide a spider wheel for a rotary incorporating implement which effectively incorporates chemicals into the soil in one pass as well as most conventional implements incorporate in two passes. It is yet another object to provide such a spider wheel having reduced draft and capable of high speed operation so that chemical can be applied just prior to planting without incurring planter delay or large traction requirements for increased productivity and late mechanical weed kill.

It is another object to provide an improved spider wheel for a rotary incorporator which has improved entry and depth control characteristics. It is a further object to provide such a wheel which may be mounted for rotation about an axis offset at a relatively large angle from the transverse direction.

It is another object of the invention to provide an improved spider wheel for a rotary chemical incorporator having a draft requirement which is substantially less than that of conventional implements and yet is able to incorporate chemicals effectively in one pass of the incorporator. It is a further object to provide such a spider wheel which has a reduced vertical force requirement for good soil penetration.

It is still another object of the invention to provide an improved rotary incorporator spider wheel having improved mixing action, trash-shedding capability, and better depth control than at least most of the previously available spider wheel configurations. It is still another object of the invention to provide a spider wheel, which is particularly useful in firmer soils, wherein the outer portions of the tines are shaped for good soil penetration and the inner portions help to limit depth of penetration of the wheel.

BRIEF SUMMARY OF THE INVENTION

A rotary incorporating implement includes a transverse beam supporting a plurality of spider wheel assemblies, each assembly including a fore-and-aft extending drawbar or a four-bar linkage pivotally connected at its forward end to the frame for rocking vertically. An inverted U-shaped wheel support having an upper transversely extending bight portion connected to the aft end of the drawbar or linkage includes downwardly directed side legs which each carry a spider wheel at the end. A first set of assemblies with short drawbars or linkages supports a row of spider wheels rearwardly adjacent the main frame. A second set of assemblies with longer drawbars or linkages supports a second row of spider wheels substantially rearwardly of the first row. The wheels are run at an angle of approximately thirty degrees or more with respect to the direction of travel, with the wheels on one half of the machine angled the opposite direction as on the other half. The wheels of the trailing row are generally centered between and angled oppositely to that of the immediately preceding wheels of the forward row. The center ridge left untilled due to the tandem wheel configuration is tilled using a special center arrangement. In the preferred embodiment, this center arrangement includes an arm at the machine center line with two oppositely angled wheels. These two wheels, as well as the two wheels located adjacent the machine center line in both the leading and trailing rows are smaller than at least a majority of the remaining wheels of the machine to allow the machine to level the soil while providing good incorporation. To feather the effect of the angled wheels at the ends of the machine, a small diameter wheel is located on the outside of the outermost large diameter wheel so that the larger wheel effectively holds the smaller wheel at a more shallow working depth. The frame is smaller than at least most tandem wheel configuration implements, and ridging and banding of chemicals are substantially eliminated. Most chemicals, and some small seed grains, can be effectively incorporated at high speeds in a single pass with reduced draft requirements. The unique configuration of spider wheels provides uniform incorporation capability across the entire width of the machine without banding of chemicals or ridging effects.

Each of the spider wheels includes a plurality of tines curving rearwardly with respect to the forward direction of rotation and having a concave front face for improved rotation and soil mixing action. The opening between the teeth is kept at a maximum and is varied linearly to increase only slightly from tooth root to the tip of the tooth to minimize wedging and permit the machine to work in severe residue conditions without collecting trash. The curvature of the tooth is established to utilize centrifugal force of the rotating wheel to expel trapped trash. In one embodiment, particularly useful for working loose soil, the spider wheel tines include end portions with relatively blunt back sides. In another embodiment, entry force is reduced and the ability to penetrate is enhanced by increasing back side angle near the end of the tines, while depth of penetration is limited by a decreased back side angle near the wheel hub. The reduced entry force provides easier rolling and permits the wheels to be mounted at an increased angle which in turn permits wider spacing of the wheels for reduced components. The controlled depth of penetration prevents the wheels from acting like solid disks by permitting soil to flow between the tines.

The utilization of two spider wheels on a single drawbar or four-bar linkage helps to cancel severe side forces. In addition, the U-shaped wheel support is somewhat resilient so that some of the side forces are absorbed without being transmitted to the drawbar or linkage and to the main frame. The overall arrangement of wheels provides a substantially balanced wheel configuration to eliminate any noticeable side forces on the frame.

These and other objects, features and advantages of the present invention will become apparent to those skilled in the art from the description which follows and from the drawings.

BRIEF DESCRIPTION OF THE DRAWINGS

FIG. 2 is a rear perspective view of a portion of the left side of the implement of FIG. 1.

FIG. 3 is a plan view of a spider wheel utilized with the implement of FIG. 1.

FIG. 4 is a sectional view of the spider wheel taken substantially along the lines 4—4 of FIG. 3.

FIGS. 5d' and 5e' show the shape of the end portions of the tines on a second embodiment of a wheel particularly useful in firmer soils.

DESCRIPTION OF THE PREFERRED EMBODIMENT

Figure 1:
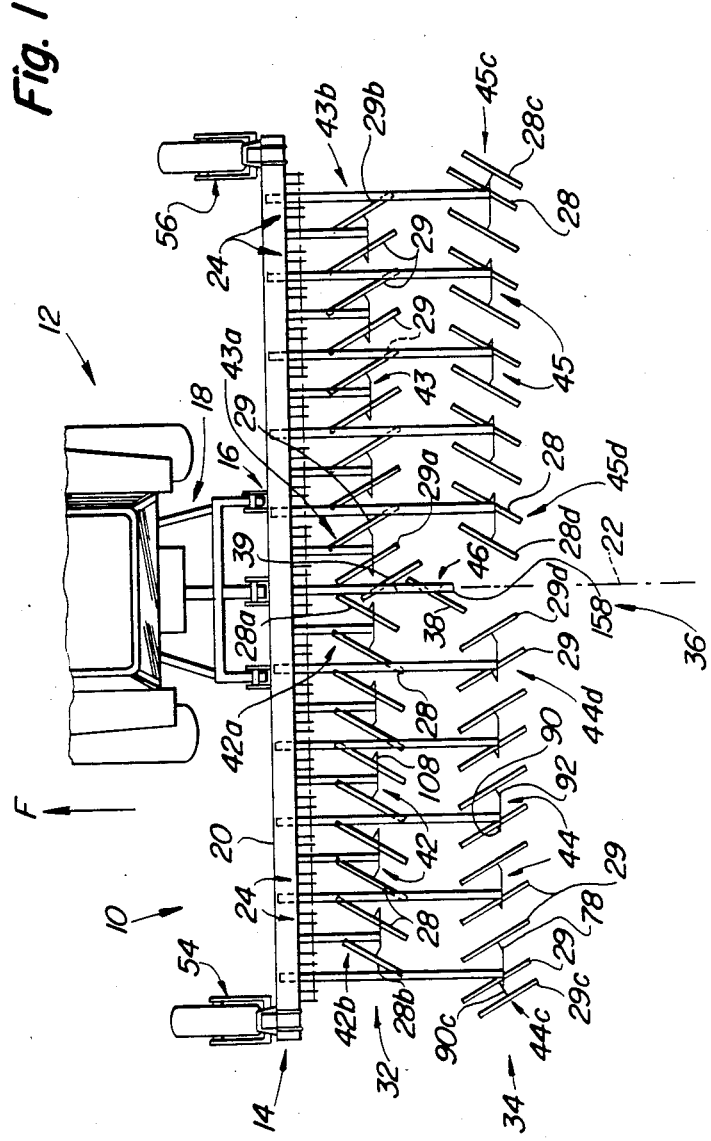
FIG. 1 is a top view of an implement constructed according to the teachings of the present invention and showing the general configuration of the spider wheels supported from the implement frame.
Figure 5A:
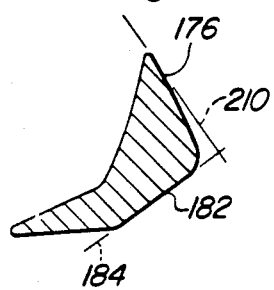
FIGS. 5a–5e are sectional views taken along lines 5a—5a through 5e—5e, respectively, of FIG. 3 and showing the shape of the tine along its length by a plurality of cross sections rotated outwardly from the tine.
Figure 5B:
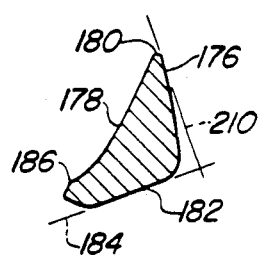
Figure 5C:
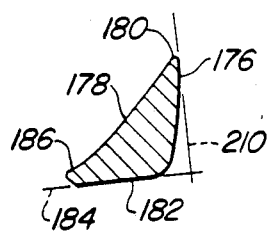
Figure 5D:
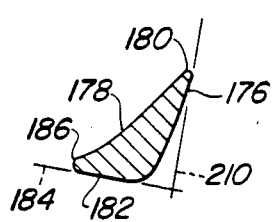
Figure 5E:
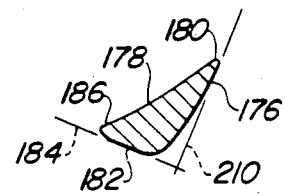
Figure 6:
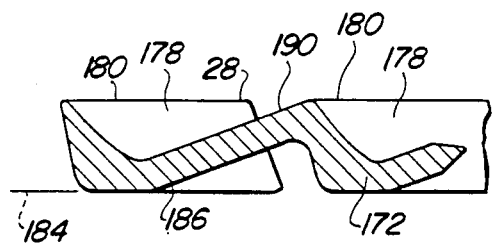
FIG. 6 is a sectional view of the hub portion of the spider wheel taken substantially along the lines 6—6 of FIG. 3.

Referring now to FIG. 1, there is shown a rotary incorporating implement indicated generally at 10 attached to a tractor 12 for forward movement F over a field wherein materials such as chemicals or seed grains are to be incorporated into the soil. The implement 10 includes a main frame 14 extending transversely to the forward direction F and having generally centrally located hitch structure 16 adapted for connection to hitch structure 18 on the towing vehicle 12 or alternately on a cart arrangement for pull-type operation behind another implement. The main frame 14 includes a tubular beam 20 extending generally an equal distance on either side of a center line 22 which bisects the implement 10.

Bracket structure, indicated generally at 24, is connected to the aft face of the tubular beam 20 and supports a tandem arrangement of rotary incorporating tools 28 and 29. The tools 28 and 29 are preferably spider wheels arranged generally in two rows, a leading row 32 and a trailing row 34. As best seen in FIG. 1, the leading row 32 includes a first set of spider wheels 28 located to the left of the center line 22 and also a second set of spider wheels 29 located generally to the right of the center line 22. The spider wheels 28 and 29 are generally uniformly spaced across the width of the machine with the spider wheels of the first set 28 supported for rotation about axes offset at an acute angle with respect to the forward direction. The spider wheels 29 of the second set are similarly spaced but are mounted for rotation about axes offset at an acute angle which is generally equal in magnitude but opposite in direction to that of the angle of the first set of wheels. The trailing row 34 of spider wheels 28 and 29 includes a third set of spider wheels 29 which are located to the left of the center line 22 and a fourth set of wheels 28 which are located to the right of the center line 22. The third and fourth sets of spider wheels 29, 28 are supported from the main frame 14 behind the first and second sets, respectively, in trailing relation thereto and are mounted for rotation about axes offset at an acute angle generally equal in magnitude to, but opposite in direction to, the acute angle of the leading first and second sets respectively. The spider wheels 29, 28 on the trailing row 34 are arranged such that a fore-and-aft extending upright plane passing through the center of a given rear wheel will bisect the area between the centers of the wheels 29, 28 immediately forward of the given wheel in row 32. The first and second sets of spider wheels 28, 29 are arranged to move dirt outwardly from the center line 22 while the third and fourth sets of spider wheels 29, 28 tend to move dirt inwardly toward the center line. The spider wheels 28, 29 of the first row are spaced transversely such that a small strip of soil is left relatively unworked between adjacent forward wheels as the implement 10 is towed in the forward direction, but the rear spider wheels 29, 28 are generally centered on the unworked strips to provide a complete overlap for good soil working and chemical mixing characteristics.

To prevent soil working and chemical mixing discontinuities in the area around the center line 22 of the implement caused by the oppositely angled wheel arrangement, a special central arrangement indicated at 36 is provided. In the preferred embodiment, the central arrangement includes a first centrally located single spider wheel 39 supported at a location offset slightly to the right of the center line 22 for rotation about an axis substantially parallel to the axis of rotation of the spider wheels 29 in the first row. The single spider wheel 39 is offset slightly rearwardly of the first row. A second centrally located single spider wheel 38 is positioned rearwardly of the first single spider wheel 39 and offset toward the opposite side of the center line 22 slightly forwardly of the rear row 34 of wheels. The axis of rotation of the wheel 38 is offset at an acute angle generally equal to, but opposite in direction to, the angle of the first single spider wheel 39. The first spider wheel 39 will tend to move the soil from the center line toward the right as viewed in the forward direction in FIG. 1. The second spider wheel 38 will move the soil adjacent the center line in the opposite direction. The innermost spider wheels, designated as 28a, 29a of the front row 32 are located on either side of the center line 22 and are offset transversely a sufficient distance to leave a small strip of unincorporated material. The innermost spider wheels 29d, 28d of the trailing row 34 are offset outwardly of the innermost spider wheels 28a, 29a, respectively, to move some of the soil and material thrown outwardly by the wheels 28a, 29a back towards the center line 22.

Most of the spider wheels 28, 29 are of equal diameter. However, the innermost wheels 28a, 29a, and 29d, 28d on opposite sides of the center line 22 of the two rows of wheels are substantially smaller than the next outwardly adjacent wheels 28, 29 and 29, 28, respectively. Also, the outermost wheels 28b and 29b are also substantially smaller than the adjacent wheels 28 and 29 to reduce the amount of soil and material thrown outwardly by the first row 32. The outermost wheels 28c and 29c of the trailing row 34 are made smaller than the next adjacent spider wheels 28 and 29 to feather the effect of the angled wheels at the ends of the machine. The wheels 39, 38 are also smaller in diameter. The arrangement 36 of smaller centrally located wheels 28a, 29a, 29d, 28d, 38 and 39 eliminates center ridges while providing uniform incorporation of chemicals in the soil worked by the center of the machine.

As best seen in FIG. 1, the spider wheels 28 and 29 in the respective sections of the forward row 32 are uniformly spaced and supported in pairs from the main frame 14 by vertically rockable wheel support assemblies 42 and 43. The wheels 29 and 28 in the respective sections of the trailing row 34 are supported by wheel support assemblies 44 and 45 which are also rockably connected to the main frame 14. A centrally located wheel support assembly 46 carries the spider wheels 38 and 39 between the innermost wheel assemblies 42a and 43a of the first row 32 and between the innermost wheel assemblies 44d and 45d of the second row 34. The wheel support assemblies 42-46 are connected for rocking about a transversely extending pivot tube 48 (FIG. 2) which is attached to the aft face of the tubular beam 20 of the main frame 14 by the brackets 24. Vertically adjustable gauge wheel assemblies 54 and 56 located on the left and right outer ends, respectively, of the tubular beam 20 generally locate the beam in the proper position when the hitch 18 lowers the main frame 14 to the field working position.

The wheel support assemblies 43 and 45 on the right-hand side of the implement 10 are substantially the mirror images of the wheel support assemblies 42 and 44, respectively, on the left-hand side of the implement. Therefore, only those assemblies on the left-hand side of the machine will be described in detail here. Referring to FIG. 2, each of the brackets 24 includes an upright and rearwardly opening channel-shaped bracket assembly 62 supported against the back face of the beam 20 by a U-bolt 64. The lower end of the channel-shaped assembly 62 extends below the bottom of the tubular beam 20 and is apertured at 66 to receive the pivot tube 48. The wheel support assembly 44 includes a fore-and-aft extending arm 68 which is generally rectangular in cross section. A transversely extending hollow, cylindrical member 72 is welded to the bottom of the arm 68 rearwardly of the forwardmost end of the arm. A gusset 74 is connected between the side of the arm 68 and the top of the cylindrical member 72. Adjacent brackets 24 are transversely spaced to receive the cylindrical member 72 therebetween, and the pivot shaft 48 is extended through the cylindrical member 72 to pivotally connect the arm 68 to the main frame 14. The forward end of the arm 68 extends under the bottom of the beam 20 to provide a transport stop for the arm when the frame 14 is lifted from the field working to the transport position.

An inverted U-shaped member 78 includes a transversely extending upper bight portion 82 which is connected adjacent its left-hand side to the aft end of the arm 68. Side legs 84 and 86 extend downwardly from the bight portion 82 to lower ends which support axle shafts 90 and 92. Each shaft in turn supports a hub 94 for rotation on a pair of bearings (not shown) spaced on the axle shaft. The hubs 94 are connected to the spider wheels 29 by four bolts 96. The hubs 94 space the wheels from their respective side legs a sufficient distance for good trash clearance.

The wheel support assemblies 42 are constructed in a fashion similar to that of the assemblies 44, and include an arm 98 connected to a cylindrical member 102 and having a gusset 104. The pivot tube 48 is inserted through the cylindrical member 102 to connect the arm 98 for rocking vertically with respect to the main frame 14. The forward end of the arm 98 projects slightly forwardly of the pivotal axis of the pivot tube 48 but yet clears the bottom of the beam 20. A transport stop shaft 106 is connected between adjacent brackets 24 above the forward end of the arm 98 to limit the downward rocking of the arm as the main frame 14 is lifted to the transport position. An inverted U-shaped member 108 includes a transversely extending upper bight portion 112 with downwardly directed left and right side legs 114 and 116, respectively. Axle shafts 120 and 122 are connected to the lower ends of the side legs 114 and 116, respectively, and rotatably support hubs 124 of the spider wheels 28 for rotation about generally parallel axes which are angled so that soil is directed outwardly from the center line 22 of the machine. The axle shafts 90 and 92 of the assembly 44 are angled so that soil is directed inwardly toward the center line 22 of the machine.

As best seen in FIG. 2, the rear U-shaped members 78 are offset inwardly (that is, to the right as viewed in FIG. 2) with respect to the supporting arm 68. The forwardmost members 108 are also offset inwardly in the same direction. The spider wheels 29 on the rear members 78 are located on the inside of (to the right of) the upright side legs 84 and 86 while the spider wheels 28 on the members 108 are located on the opposite or outward sides of the side legs 114 and 116. The outermost wheel 28 on the assembly 42 therefore is positioned centrally with respect to the spider wheels 29 located on the next outwardly adjacent assembly 44, while the innermost wheel 28 of the assembly 42 is located between the adjacent wheels 29 of the adjacent assemblies 44.

Down pressure spring assemblies 132 and 134 are connected between the frame 14 and the wheel support assemblies 42 and 44 to bias the corresponding wheels 28 and 29 into engagement with the soil. The assembly 132 includes a spring 136 having one end connected by a bracket 138 to the underside of the arm 98 and an opposite end connected to a spring retaining rod 140 which extends through the lower portions of the brackets 24 below the pivot tube 48. The assembly 134 includes a spring 146 having one end connected to a bracket 148 via a turnbuckle 150 and an opposite end connected to the spring retaining rod 140. The spring 136 is selected to provide approximately three times the down pressure on the forward row 32 of wheels 28 as compared with the down pressure on the rear row 34 of wheels 29. An additional spring 136 may be mounted between the bracket 138 and the spring retaining rod 140 to provide the necessary down pressure, while in many situations it is possible to eliminate the spring 146 for the rear support assemblies 44 since the weight of the assemblies may be adequate without further bias to provide the necessary down pressure on the wheels 29.

The innermost wheels 28a, 29a (FIG. 1) on the wheel support assemblies 42a and 43a, respectively, and the innermost wheels wheels 29d, 28d on assemblies 44d, 45d, respectively, on either side of the center line 22 are substantially smaller than the outermost wheels on the same assemblies, and therefore the outermost wheels tend to limit the depth of penetration of the innermost wheels to reduce the amount of dirt thrown by the innermost wheels. The smaller depth limited wheels also provide more of a combing action as the tines move transversely through the soil.

The centrally located single spider wheels 38 and 39 are supported on an intermediate length arm 158 connected to the pivot tube 48 in substantially the same manner as the arms 68. A down pressure spring arrangement similar to that shown at 134 for the arm 68 may also be utilized. The forward spider wheel 39 is connected to the lower end of a side leg (not shown) which is connected near the central portion of the arm 158 and supports the wheel 39 for rotation about an axis generally parallel to the axis of rotation of the spider wheels 29 on the assemblies 43. The rear single spider wheel 38 is connected to the lower end of a second side leg which is located to the left of and rearwardly of the first side leg. The lower end of the rear side leg supports the wheel 38 for rotation about an axis generally parallel to the axis of rotation of the spider wheels 28 on the assemblies 42. The net outward flow of dirt from the area around the center line 22 caused by the outwardly angled and generally smaller diameter spider wheels 28a, 29a, 38 and 39 substantially matches the net inward flow produced by the spider wheels 28, 28d and 29, 29d of the assemblies 44d, 45d located adjacent the center line 22. The smaller outermost spider wheels 28b and 29b of the first row 32, which are also limited in depth of penetration by the adjacent larger diameter spider wheels 28 and 29 supported on the assemblies 42b and 43b, respectively, tend to reduce the amount of dirt thrown outwardly at the ends of the first row 32. The two outermost wheels 29 and 29c of assembly 44c, and 28 and 28c of assembly 45c on the trailing row 34 of wheels are both located transversely outwardly of the corresponding forward wheels 28b and 29b to provide a net inward flow from row 34 which is generally equal to the net outward flow from row 32. The large diameter wheels 28 and 29 of the assemblies 45c and 44c, respectively, effectively hold the smaller corresponding wheels 28c and 29c at the outermost ends of the implement at a more shallow working depth to provide a combing action which feathers the effect of the angled wheels at the ends of the machine.

The wheels 28a, 29a are spaced transversely to permit some of the material that is to be incorporated into the soil to go through the center of the machine undisturbed. By reducing the size of the wheels 28a, 29a, the material that is disturbed is not thrown outwardly from the center as far as it would be if the larger wheels 28 and 29 were used. The wheels 39, 38 mix the strip left undisturbed by the forward wheels 28a, 29a causing the strip of material to be split outwardly, but because the wheels 39, 38 are also relatively small in diameter, most of the soil and material does not move outwardly beyond the trailing wheels 29d, 28d. However, the wheels 29d, 28d are also smaller in diameter to both permit some of the soil and material moved by the forward wheels 28a, 29a to go outwardly of the wheels 29d, 28d. The widely spaced, smaller diameter wheels open the area between the sets of wheels in the rear row 34 to substantially eliminate hilling. The arrangement of the six smaller diameter wheels 28a, 29a, 39, 38, 29d and 28d thus eliminates hilling while assuring that enough material to be incorporated remains adjacent the central area of the machine for a uniform incorporation pattern. It was only after considerable experimentation and testing with numerous wheel patterns that the pattern of FIG. 1 was devised which provides not only a level seed bed without ridges or loss or gain of dirt in a given area, but also uniform incorporation characteristics across the entire width of the machine without noticeable side forces acting on the frame 14.

Figure 7:
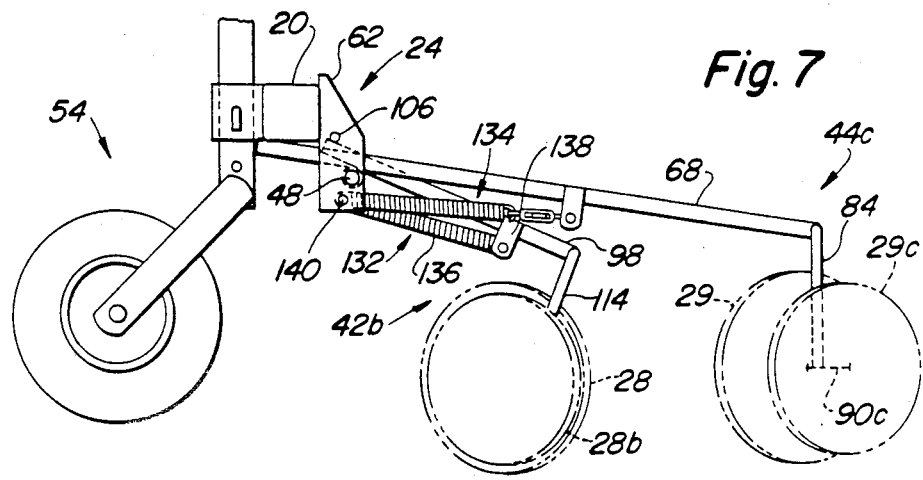
FIG. 7 is a plan view of the left side of the implement of FIG. 1.
Figure 5D:
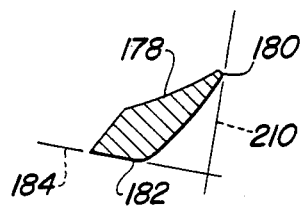
Figure 5E:
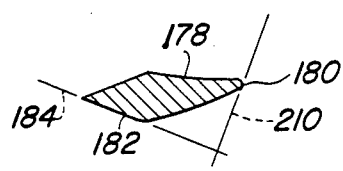

The general construction of the wheel assembly 44c (and therefore the assembly 45c which is generally the mirror image of 44c) is substantially identical to that of the assembly 44 with the exception of the outer axle 90c (FIG. 7) which extends through the lower end of the side leg 84 and supports the smaller diameter spider wheel 29c outwardly of the side leg 84. The construction of the forward wheel assembly 42b (and therefore 43b) is substantially identical to that of the construction of the assemblies 42 (43) with the exception that the outermost spider wheel 28b (29b) is substantially smaller than the corresponding inner spider wheel 28 (29). Likewise, the assemblies 42a and 44d are similar to the assemblies 42 and 44, only the inner wheels 28a and 29d are smaller.

The spider wheels are substantially larger and designed differently than conventional rotary hoe spider wheels to provide better rolling action, soil and chemical (or other material) mixing action, and better cleaning action in trashy conditions than at least most previously available spider wheels for rotary hoes. The spider wheels 28, which are designated left-hand spider wheels because they typically move soil from the right to the left, are substantially the mirror image of the spider wheels 29, designated as right-hand wheels since soil is moved toward the right. The smaller spider wheels 28a-d and 38 are constructed substantially identically to each other and in a similar fashion to the wheels 28 but having a diameter substantially smaller than the wheels 28. The wheels 29a-b and 39 are substantially identical to each other and are similar to the wheels 29 but are substantially smaller in diameter than the wheels 29. Therefore, since the wheels are constructed with similar principles, only the larger left-hand spider wheel 28 will be described in detail here, it being understood that the right-hand wheels 29 are mirror images of the wheels 28, and the smaller wheels on the ends and central portion of the implement are generally smaller versions of the larger wheels, except for the cross section of the tines which remain substantially identical in size to that of the larger wheels to retain tine strength.

Referring to FIGS. 3-6, the wheel 28 includes a hub portion 172 with a plurality of tines 174 extending radially outwardly from the hub portion and curving rearwardly with respect to, or curving in the opposite direction as, the forward direction of rotation (arrow) with a general radius of curvature which is substantially smaller than the radius of the wheel 28. The tine 174 includes a rearwardly directed blunt face 176 and a concave soil working front face 178, opposite the back face 176. The back face 176 and front face 178 converge at an acute angle (FIG. 5) to define a curved side edge 180. A relatively flat side 182 is located opposite the edge 180 and lies generally on the wheel plane designated at 184. The front face 178 includes a forwardly directed lip portion 186 located adjacent the side 182 for improved soil throwing and mixing action. The side edge 18 lies substantially on a radius of curvature $R_1$ centered at a location near the root of the rearwardly adjacent tine 174. The radius of curvature $R_2$ of the rear portion of the tooth corresponding to the lip 186 is approximately equal to $R_1$, but the center of the radius $R_2$ is located radially outwardly of the hub portion 172 behind the rearwardly adjacent tine 174. At a central location designated at 187 in FIG. 3, the curvature of the rear portion of the tooth decreases to a radius $R_3$ substantially greater than the radius $R_1$ and $R_2$. The center of the radius of curvature $R_3$ is located on the second rearward tine slightly radially outwardly of the hub portion 172. The particular construction of the tines 174 provides a very open gullet portion indicated generally at 189 which is substantially U-shaped, and wherein the distance between a given tine and the rearwardly adjacent tine decreases only slightly from the end of the tine toward the hub to reduce wedging of trash and facilitate expulsion of trash by centrifugal force. As is evident from FIG. 3, as a tine 174 is leaving the ground the gullet area between that tine and the next rearward tine opens substantially downwardly. The outer edge of the hub 172 defines a relatively straight inner gullet area 190 connected to the rear portion of the tine 174 by a relatively large radius at 192, and to the edge 180 by a slightly smaller radius 194 to further reduce possibility of wedging. The area 190 is sharpened to help cut through trash. The area 190 extends from the edge 180 at the base of a given tine 174 diagonally (FIG. 6) to the lip portion 186 at the base of the next forwardly adjacent tine 174. The curved edge 180 continues inwardly to a center axle-hub receiving portion 198 which is apertured at 200 to receive the bolts 96 for mounting. The soil working surface 178 is generally continuous into the hub portion 172 and terminates at the portion 198. Cavities are formed at areas 204 to reduce the amount of material necessary to fabricate the wheel 28.

The tine cross section, which is best illustrated in FIG. 5 wherein various sections along the length of the tine are rotated ninety degrees outwardly from the radius $R_1$ at that location, increases in thickness toward the base of the tine. In the first embodiment (FIGS. 5a-5e), the back face 176, which first engages the soil, forms a relatively flat angle with the horizontal; the angle of intersection of a line 210, parallel to the axis of rotation of the wheel 28, and the back face 176 is preferably thirteen degrees or less. By way of example, the angle between the line 210 and the face 176 is ten degrees at section 5a, nine degrees at section 5b, ten degrees at section 5c, thirteen degrees at section 5d and eleven degrees at section 5e. The angle of the soil working surface 178, adjacent the edge 180, with respect to a line parallel to the wheel plane 184 increases from about thirty-seven degrees at the base of the tine to approximately fifty-five degrees near the tip of the tine. By way of example, the angle between the line 184 in FIG. 5 and the surface 178 adjacent the edge 180 is about thirty-seven degrees for section 5a, forty-three degrees for section 5b, forty-five degrees for section 5c, fifty degrees for section 5d and fifty-five degrees for section 5e. The tine 174 includes an outermost tip portion 212, with the rear face 176 at the tip 212 forming an angle of approximately twenty-one degrees with a plane extending perpendicularly to the wheel plane 184 and passing through the outermost portion of the edge 180. The above-described tine construction not only provides aggressive mixing and soil throwing action but it also provides a large effective profile on the tine lowermost in the soil to power the wheel for good rotation and entry of the relatively blunt back side 176 into the soil. As the tines 174 rotate in the soil about an axis offset with respect to the forward direction, the tines move laterally in the soil in the direction of the edge 180, moving some dirt and chemicals in the same general direction while permitting some of the remaining dirt and chemicals to slide between the tines.

In the second embodiment (FIGS. 5a–5c, 5d' and 5e') the wheel is similar in construction to the wheel described above, with the exception of the outer portion of each tine (radially outwardly of the sectional line 5c—5c of FIG. 3) which in effect is twisted to substantially increase the angle of the back face 176' which first engages the soil. The back face 176' forms a relatively steep angle with the horizontal for easier penetration of the soil. The angle of intersection of the line 210 parallel to the axis of rotation and the back face 176' is preferably fifty degrees or more. The edge 186 is also eliminated on the end portion of the tine 174 to prevent an increase in the effective tine height relative to the line 210. The inner portion of the tine 174 (radially inwardly of line 5c—5c of FIG. 3) may remain essentially the same as described above for the first embodiment with the back face 176 at a relatively flat angle with respect to the horizontal. Alternatively, the angle between the line 210 and the back face 176 on the inner portion of the tine 174 may be decreased even further to better limit penetration depth. By way of example only, the angle between the line 210 and the face 176 at section 5b may be reduced to zero degrees. This construction provides easy penetration of firm soils up to the desired depth and resistance to penetration beyond that depth. By limiting penetration, the amount of soil worked is minimized and the hub 190 is prevented from interfering with soil flow between the tines 174 which would reduce mixing.

In the preferred embodiment, the wheel 28 is substantially larger in diameter than a conventional rotary hoe wheel, and no more than ten tires 174 are uniformly spaced about the hub to provide good clearance and trash flow characteristics between the adjacent tines. In the preferred embodiment, the wheels 28 (and 29) are approximately 500 mm in diameter. The smaller wheels at the ends and central locations on the implement are at least approximately ten percent smaller, or approximately 450 mm in diameter. The diameter of the hub portion 172 is slightly larger than half the diameter of the wheel. For example, the wheel 28 has a hub diameter of approximately 280 mm. Also, by way of example, the radii $R_1$ and $R_2$ are preferably slightly less than half the radius of the wheel while the radius $R_3$ is substantially greater than half the radius of the wheel. In the preferred embodiment, $R_1$ and $R_2$ are 120 mm and $R_3$ is 170 mm. Also, in the preferred embodiment, the wheel axes are angled thirty degrees or more with respect to the transverse, direction, and the spacing between adjacent wheels on each section of the machine 10 is approximately one half the wheel diameter (approximately 250 mm) or more. The spacing between the innermost wheels 28a and 29a of the first row 32 is approximately three-fourths the diameter of the larger wheels or approximately 380 mm. The center of rotation of the single spider wheel 39 is offset to the right of the center line 22 by a distance approximately equal to one-eighth of the diameter of the large wheel. The single spider wheel 38 is offset in the opposite direction an equal distance. Therefore, in the example given, the transverse spacing between the wheel centers of the wheels 38 and 39 is approximately 120 mm to provide sufficient overlap of the wheels to assure that the soil adjacent the center line is adequately worked.

In the preferred embodiment, utilizing the wheels of the first embodiment, approximately 110 pounds of down pressure are provided on each wheel of the leading row 32 while the wheels of the trailing row 34, working primarily in soil that has been previously loosened by the first row 32, have a down pressure of approximately one third that of the wheels of the first row. The down pressure on each of the rear wheels is approximately thirty-five pounds. When the heels of the second embodiment are utilized, the necessary vertical force is reduced by as much as seventy percent and the ability of the wheels to penetrate the soil to a greater depth is enhanced. The supporting arms 68 and 98 (FIG. 2) may also take the form of conventional parallel four-bar linkages (not shown) to resist draft through the linkages rather than through the springs 136 and 146 to better reap the benefit of the reduced vertical force requirements.

The rear row 34 is spaced a substantial distance behind the forward row 32, preferably such that the forwardmost extremities of the wheels in the trailing row 34 are at least spaced by a distance equal to the diameter of the large wheels, or approximately 500 mm, from the rearmost extremities of wheels on the forward row 32. This configuration provides good trash clearance between the rows and also permits the positioning of the single spider wheels 38 and 39 adjacent the center line 22 between the rows 32 and 34 without trash flow problems.

During mounting of the shorter assemblies 42 to the frame 14, the stop shaft 106 may be removed from the brackets 24 for assembly with the springs 136 in a completely relaxed state. After the springs 136 are attached between the brackets 138 and the spring retaining rod 140, the implement may be lowered to tension the spring and bring the forward end of the drawbar 98 to a position below that wherein the stop shaft 106 may be inserted. If the springs 146 are utilized on the longer arms 68, the turnbuckle 150 may be adjusted to also permit assembly of the wheel support assemblies 44 and 45 to the frame 14 with the springs 146 in the uncompressed state.

The side legs 114, 116 and 84, 86 provide resiliency to absorb some of side loading resulting from the angled spider wheels. Mounting the wheels in pairs from the arms 68 and 98 not only reduces the cost and complexity of the machine and provides good ground contour following not available in large gang arrangements, but also helps to reduce the amount of side loads from the wheels that are transferred to the main frame 14. The generally symmetrical pattern of the wheel configuration about the center line 22 reduces the moments acting to move the tractor 12 away from the forward direction to a negligible amount.

Having described the preferred embodiment, it will be apparent that modifications can be made without departing from the scope of the invention as defined in the accompanying claims.

We claim:

1. A spider wheel for a rotary incorporator adapted for towing in a given direction, said spider wheel adapted to be supported for forward rotation about an axis offset at a preselected acute angle with respect to the direction transverse to said given direction, said spider wheel comprising a hub, a plurality of tines extending radially outwardly from the hub and curving rearwardly with respect to the forward direction of rotation, said tines each comprising a rearwardly directed back face, a front face opposite the back face defining a soil working surface, said front face and back face converging at an acute angle to a side edge extending along a substantial portion of the length of the tine and adapted to move transversely through the soil, a side face located opposite the side edge and extending between the front and back faces, and wherein the intersection of said back face with a line parallel to the axis of rotation of the wheel defines an angle of substantially less than twenty-five degrees whereby upon rotation of the wheel in the soil said back face is first to engage the soil and engages the soil at a relatively flat angle.

2. The invention as set forth in claim 1 wherein the front face includes a forwardly directed lip located adjacent the side face.

3. The invention as set forth in claim 1 wherein the angle of intersection of the back face and the line parallel to the axis of rotation is less than fifteen degrees.

4. The invention as set forth in claim 1 wherein the diameter of the hub is on the order of one half the diameter of the spider wheel.

5. The invention as set forth in claim 4 wherein the hub includes a sharp outer surface extending between adjacent tines for cutting trash.

6. The invention as set forth in claim 1 wherein the tines are curved rearwardly with a radius of curvature substantially less than the wheel radius, and the separation between a given tine and the next adjacent tine remains approximately the same, or decreases only slightly from the end of a given tine toward the hub to reduce wedging of trash and to facilitate expulsion of trash by centrifugal force.

7. The invention as set forth in claim 6 wherein the area of the hub between adjacent tines includes a trash-cutting edge.

8. The invention as set forth in claim 6 wherein the wheel diameter is on the order of 450 mm and no more than ten tines are equally spaced about the hub.

9. The invention as set forth in claim 1 wherein said preselected spider wheel axis angle is approximately thirty degrees and wherein the front face includes a substantial portion angled with respect to the axis of rotation by at least thirty-five degrees so that said front face engages the soil at an angle of substanatially less than forty-five degrees with respect to the transverse.

10. A spider wheel for a rotary incorporator adapted for towing in a given direction, said spider wheel adapted to be supported for forward rotation about an axis offset at a preselected acute angle with respect to the direction transverse to said given direction, said spider wheel comprising a hub, a plurality of tines extending radially outwardly from the hub and curving rearwardly with respect to the forward direction of rotation, said tines each comprising a rearwardly directed back face, a front face opposite the back face defining a soil working surface, said front face and back face converging at an acute angle to a side edge extending along a substantial portion of the length of the tine and adapted to move transversely through the soil, and a side face located opposite the side edge and extending between the front and back faces, wherein the tines include radially inward and outward portions, said outward portion including a back face portion angled at an angle of greater than fifty degrees with respect to the horizontal for easy penetration of the soil, and said inward portion including a back face portion angled at an angle of less than twenty-five degrees with respect to the horizontal to resist penetration of the soil beyond a preselected depth.

11. The invention as set forth in claim 10 wherein the back face portion of the radially outward portion is angled at an angle of at least approximately fifty degrees with respect to the horizontal.

12. The invention as set forth in claim 10 wherein the back face portion of the radially inward portion is angled at an angle of approximately ten degrees or less with respect to the horizontal.

13. A spider wheel for a rotary incorporator adapted for towing in a given direction, said spider wheel adapted to be supported for forward rotation about an axis offset at a preselected acute angle with respect to the transverse direction to said given direction, said spider wheel comprising a hub, a plurality of tines extending radially outwardly from the hub and curving rearwardly with respect to the forward direction of rotation, said tines each comprising radially outer an inner portions with a back face and a front face opposite the back face defining a soil working surface, said front face and back face converging at an acute angle to a side edge extending along a substantial portion of the length of the tine and adapted to move transversely through the soil, and a side face located opposite the side edge and extending between the front and back faces, the back face on said outer portion being angled at a substantially larger angle with respect to the horizontal than the back face on said inner portion for providing enhanced penetration of the outer portion and depth control of the inner portion and wherein the tines are curved rearwardly with a radius of curvature substantially less than the wheel radius, and the separation between a given tine and the next adjacent tine remains approximately the same, or decreases only slightly from the end of a given tine toward the hub to reduce wedging of trash and to facilitate expulsion of trash by centrifugal force.

* * * * *